US012693534B2

(12) United States Patent
DeLapp et al.

(10) Patent No.: US 12,693,534 B2
(45) Date of Patent: Jul. 28, 2026

(54) DISPLAYS WITH DISPERSION-COMPENSATING INTERLEAVED GRATINGS

(71) Applicant: Apple Inc., Cupertino, CA (US)

(72) Inventors: Scott M. DeLapp, San Diego, CA (US); Se Baek Oh, Hillsborough, CA (US)

( * ) Notice: Subject to any disclaimer, the term of this patent is extended or adjusted under 35 U.S.C. 154(b) by 440 days.

(21) Appl. No.: 18/181,374

(22) Filed: Mar. 9, 2023

(65) Prior Publication Data

US 2023/0314810 A1 Oct. 5, 2023

Related U.S. Application Data

(63) Continuation of application No. PCT/US2021/050103, filed on Sep. 13, 2021.

(60) Provisional application No. 63/083,386, filed on Sep. 25, 2020.

(51) Int. Cl.
*G02B 27/01* (2006.01)
*G03H 1/02* (2006.01)

(52) U.S. Cl.
CPC ....... *G02B 27/0172* (2013.01); *G03H 1/0248* (2013.01); *G02B 2027/0174* (2013.01); *G03H 2223/23* (2013.01)

(58) Field of Classification Search
CPC ........ G02B 27/0172; G02B 2027/0174; G02B 27/0081; G02B 2027/0125; G03H 1/0248; G03H 2223/23
See application file for complete search history.

(56) References Cited

U.S. PATENT DOCUMENTS

| | | | |
|---|---|---|---|
| 10,295,723 B1 | 5/2019 | Lee et al. | |
| 2019/0004321 A1 | 1/2019 | Grey et al. | |
| 2020/0026074 A1* | 1/2020 | Waldern | G02B 6/0076 |
| 2020/0096771 A1 | 3/2020 | Oh et al. | |
| 2020/0116997 A1 | 4/2020 | Lee et al. | |
| 2020/0264378 A1 | 8/2020 | Grant et al. | |

* cited by examiner

*Primary Examiner* — Collin X Beatty
(74) *Attorney, Agent, or Firm* — Treyz Law Group, P.C.; Michael H. Lyons

(57) ABSTRACT

A display may include a waveguide, a diffractive input coupler, and an output coupler. The input coupler may diffract image light into the waveguide. The output coupler may diffract the image light out of the waveguide and towards an eye box. The output coupler may include a first volume hologram with a first grating vector and a second volume hologram with a second grating vector. The first and second grating vectors may be oriented at the same angle from opposing sides of an axis. The input coupler may have a first pitch. The first and second volume holograms may have a second pitch. The second pitch may be constant across the output coupler. In order to mitigate dispersion by the input coupler, the second pitch may be equal to twice the first pitch times a cosine of the angle.

12 Claims, 9 Drawing Sheets

DISPLAYS WITH DISPERSION-COMPENSATING INTERLEAVED GRATINGS

This application is a continuation of international patent application No. PCT/US2021/050103, filed Sep. 13, 2021, which claims priority to U.S. provisional patent application No. 63/083,386, filed Sep. 25, 2020, which are hereby incorporated by reference herein in their entireties.

BACKGROUND

This disclosure relates to systems with optical components and, more particularly, to systems with optical components for displays. Electronic devices often include displays that present images at a user's eyes. As examples, electronic devices such as virtual and augmented reality headsets often include displays with optical elements that allow users to view the displays. It can be challenging to design devices such as these. If care is not taken, the components used in displaying content may not exhibit a desired optical performance.

SUMMARY

An electronic device may have a display system. The display system may include a waveguide, an input coupler, and an output coupler. The input coupler may be a diffractive input coupler and may include a surface relief grating or a volume hologram. The input coupler may diffract the image light to couple the image light into the waveguide. In diffracting the image light, the input coupler may introduce dispersion to the image light. The output coupler may couple the image light out of the waveguide and towards an eye box. The output coupler may cancel out the dispersion introduced by the input coupler.

The output coupler may include at least a first volume hologram and a second volume hologram that at least partially overlaps the first volume hologram in the same volume of a grating medium. The first volume hologram may diffract the image light as first diffracted light. The second volume hologram may diffract the image light as second diffracted light. The first volume hologram may diffract the second diffracted light out of the waveguide. The second volume hologram may diffract the first diffracted light out of the waveguide.

The first volume hologram may have a first grating vector. The second volume hologram may have a second grating vector. The first and second grating vectors may be oriented at the same angle but from opposing sides of an axis. The axis may, for example, be oriented parallel to a grating vector of the input coupler. The input coupler may have a first pitch. The first volume hologram may have a second pitch. The second volume hologram may also have the second pitch. The second pitch may be constant across the area of the output coupler. In order to mitigate dispersion by the input coupler, the second pitch may be equal to twice the first pitch times a cosine of the angle.

DETAILED DESCRIPTION

Figure 1:
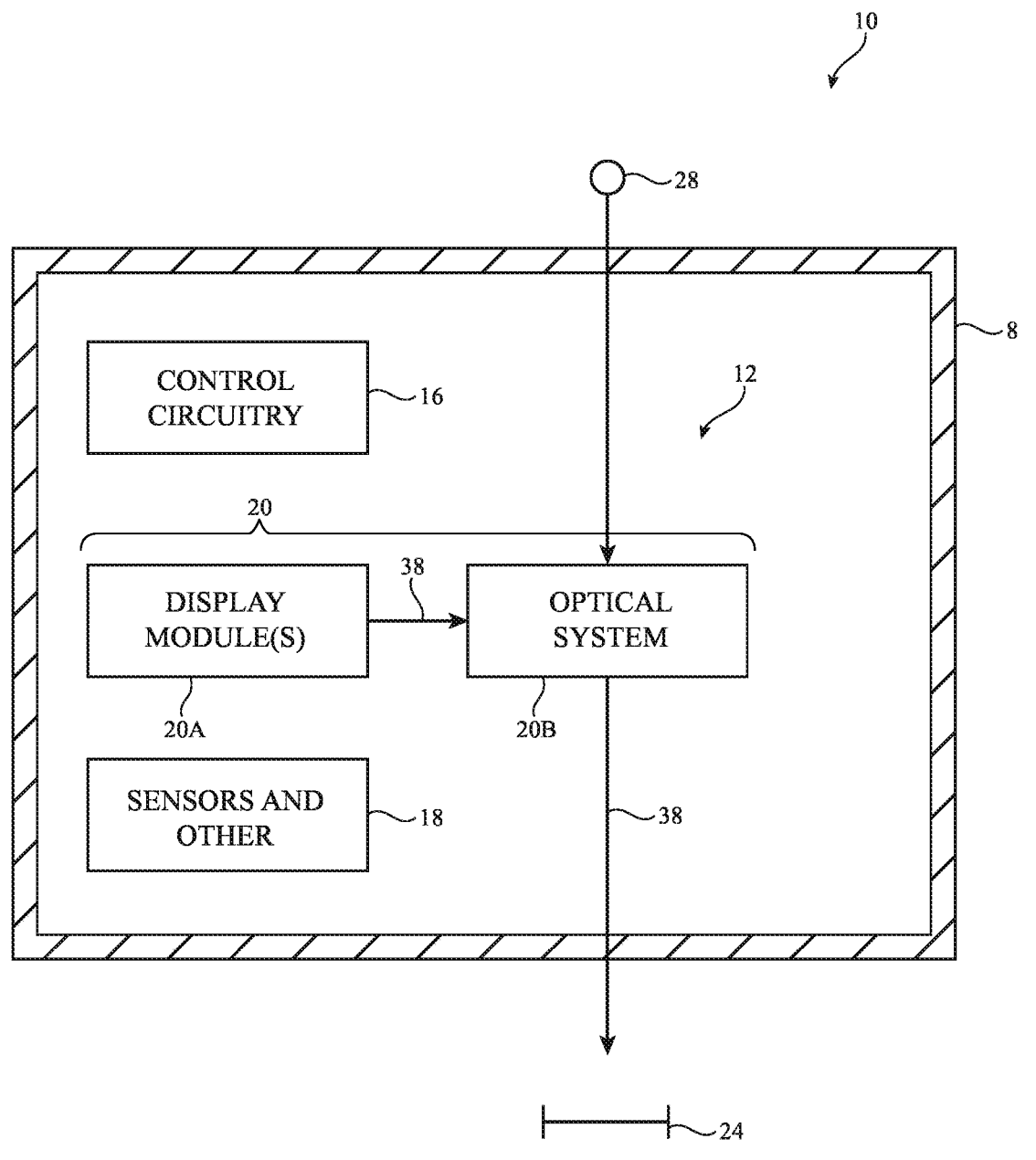
FIG. 1 is a diagram of an illustrative system having a display in accordance with some embodiments.

System 10 of FIG. 1 may be a head-mounted device having one or more displays. The displays in system 10 may include near-eye displays 20 mounted within support structure (housing) 8. Support structure 8 may have the shape of a pair of eyeglasses (e.g., supporting frames), may form a housing having a helmet shape, or may have other configurations to help in mounting and securing the components of near-eye displays 20 on the head or near the eye of a user. Near-eye displays 20 may include one or more display modules such as display modules 20A and one or more optical systems such as optical systems 20B. Display modules 20A may be mounted in a support structure such as support structure 8. Each display module 20A may emit light 38 (image light) that is redirected towards a user's eyes at eye box 24 using an associated one of optical systems 20B.

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.).

Display modules 20A may be liquid crystal displays, organic light-emitting diode displays, laser-based displays, or displays of other types. Optical systems 20B may form lenses that allow a viewer (see, e.g., a viewer's eyes at eye box 24) to view images on display(s) 20. There may be two optical systems 20B (e.g., for forming left and right lenses) associated with respective left and right eyes of the user. A single display 20 may produce images for both eyes or a pair of displays 20 may be used to display images. In configurations with multiple displays (e.g., left and right eye displays), the focal length and positions of the lenses formed by components 20B may be selected so that any gap present between the displays will not be visible to a user (e.g., so that the images of the left and right displays overlap or merge seamlessly).

If desired, optical system 20B may contain components (e.g., an optical combiner, etc.) to allow real-world image light from real-world images or objects 29 to be combined optically with virtual (computer-generated) images such as virtual images in image light 38. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement which a camera captures real-world images of object 29 and this content is digitally merged with virtual content at optical system 20B).

System 10 may, if desired, include wireless circuitry and/or other circuitry to support communications with a computer or other external equipment (e.g., a computer that supplies display 20 with image content). During operation, control circuitry 16 may supply image content to display 20. The content may be remotely received (e.g., from a computer or other content source coupled to system 10) and/or may be generated by control circuitry 16 (e.g., text, other computer-generated content, etc.). The content that is supplied to display 20 by control circuitry 16 may be viewed by a viewer at eye box 24.

Figure 2A:
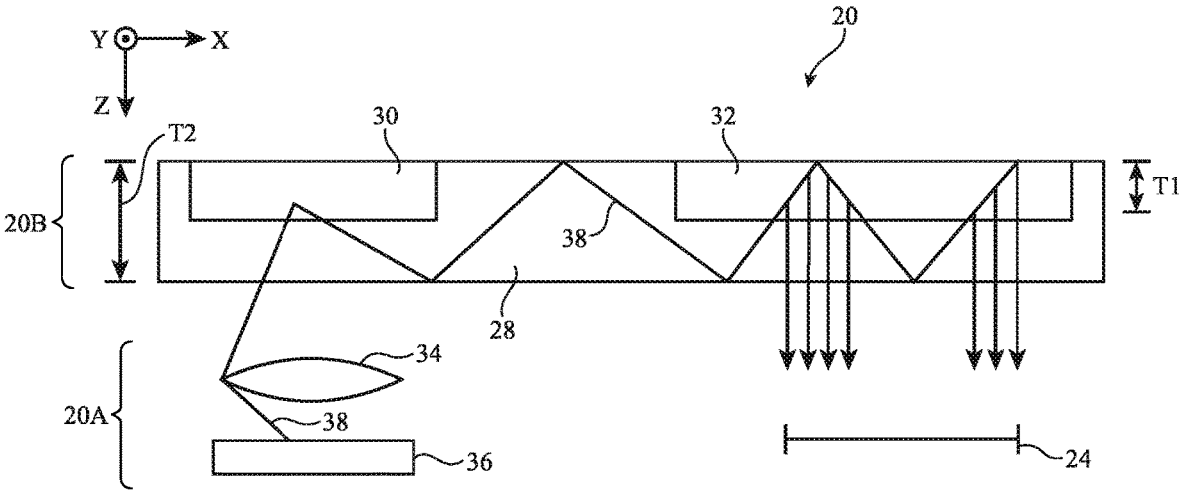
FIG. 2A is a top view of an illustrative display system having an optical system including an input coupler and an output coupler at least partially embedded in a waveguide substrate in accordance with some embodiments.

FIG. 2A is a top view of an illustrative display 20 that may be used in system 10 of FIG. 1. As shown in FIG. 2A, near-eye display 20 may include one or more display modules such as display module 20A and an optical system such as optical system 20B. Optical system 20B may include optical elements such as waveguide 28, input coupler 30, and output coupler 32. Display module 20A may include a display unit 36 and a collimating lens 34. If desired, display module 20A may be mounted within support structure 8 of FIG. 1 while optical system 20B may be mounted between portions of support structure 8 (e.g., to form a lens that aligns with eye box 24). Other mounting arrangements may be used, if desired.

Display unit 36 may be a display unit based on a liquid crystal display, organic light-emitting diode display, cathode ray tube, plasma display, projector display (e.g., a projector based on an array of micromirrors), liquid crystal on silicon display, or other suitable type of display. Display 36 may generate light 38 associated with image content to be displayed to eye box 24. Light 38 may be collimated using a lens such as collimating lens 34. Optical system 20B may be used to present light 38 output from display unit 36 to eye box 24.

Figure 2B:
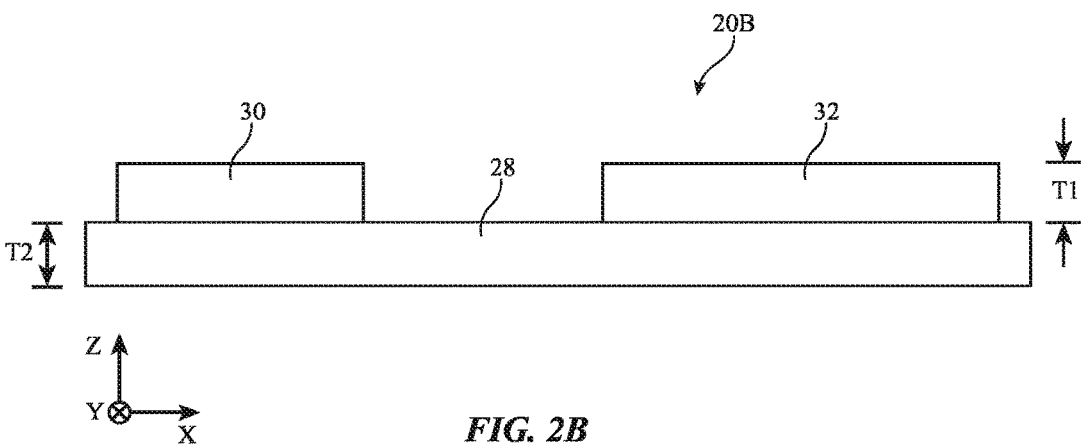
FIG. 2B is a top view of an illustrative display system having an optical system including an input coupler and an output coupler formed on a waveguide substrate in accordance with some embodiments.

Optical system 20B may include one or more couplers such as input coupler 30 and output coupler 32. In the example of FIG. 2A, input coupler 30 and output coupler 32 are at least partially embedded in a waveguide structure such as waveguide 28 (e.g., a polymer, glass, or other transparent substrate capable of guiding light via total internal reflection). In the example of FIG. 2B, input coupler 30 and output coupler 32 are formed on an outer surface of waveguide 28.

Input coupler 30 may be configured to couple light 38 from display unit 36 into waveguide 28, whereas output coupler 32 may be configured to couple light 38 from within waveguide 28 to the exterior of waveguide 28 towards eye box 24. For example, display 36 may emit light 38 in direction −Z towards optical system 20B. When light 38 strikes input coupler 30, input coupler 30 may redirect light 38 so that it propagates within waveguide 28 via total internal reflection towards output coupler 32 (e.g., in direction X). When light 38 strikes output coupler 32, output coupler 32 may redirect light 38 out of waveguide 28 towards eye box 24 (e.g., back along the Z-axis).

Input coupler 30 and output coupler 32 may be based on reflective and refractive optics or may be based on holographic (e.g., diffractive) optics. In arrangements where couplers 30 and 32 are formed from reflective and refractive optics, couplers 30 and 32 may include one or more reflectors (e.g., an array of micromirrors, partial mirrors, or other reflectors). In arrangements where couplers 30 and 32 are based on holographic optics, couplers 30 and 32 may include volume holographic media such as photopolymers, gelatin such as dichromated gelatin, silver halides, holographic polymer dispersed liquid crystal, or other suitable volume holographic media.

A holographic recording may be stored as an optical interference pattern (e.g., alternating regions of different indices of refraction) within the photosensitive optical material. The optical interference pattern may create a holographic grating that, when illuminated with a given light source, diffracts light to create a three-dimensional reconstruction of the holographic recording. The diffractive grating may be a non-switchable diffractive grating that is encoded with a permanent interference pattern or may be a switchable diffractive grating in which the diffracted light can be modulated by controlling an electric field applied to the holographic recording medium.

If desired, couplers 30 and 32 may have thickness T1. Waveguide 28 may have thickness T2. Thicknesses T1 and T2 may be any desired values. If desired, couplers 32 and 30 may be sandwiched between different substrate layers in the waveguide. In another suitable arrangement, couplers 30 and 32 may be formed on the surface of waveguide 28, as shown in FIG. 2B (e.g., as opposed to being embedded in waveguide 28 as shown in FIG. 2A).

Using thick films for couplers 30 and 32 may help increase uniformity in the output image and may provide more material in which to record different optical functions. One optical function recorded in coupler 30, for example, may redirect light having a given input angle to a first output angle (e.g., 45°), whereas another optical function recorded in coupler 30 may redirect light having a given input angle to a second output angle (e.g., 60°). Couplers 30 and 32 may, if desired, be multiplex holograms (e.g., three-color holograms such as red-green-blue holograms) for forming color images. The diffraction efficiency in each coupler 30 and 32 may be modulated (e.g., may vary across the width of couplers 30 and 32) so that light exits each coupler in a smooth, uniform manner.

In practice, it may be desirable for output coupler 32 to fill as large of an eye box 24 with uniform intensity light 38 as possible. If desired, light redirecting elements in output coupler 32 may be configured to expand light 38 in one or more dimensions while also coupling light 38 out of waveguide 28. The light redirecting elements may be formed from mirrors (e.g., partially reflective mirrors) or diffractive gratings (e.g., volume holograms) as two examples.

In some scenarios, different light redirecting elements are arranged in a sequential manner in the output coupler for redirecting the light in different directions. However, arranging light redirecting elements in a sequential manner may consume an excessive amount of space within system 10, where space is often at a premium. Space within system 10 may be more efficiently utilized by co-locating multiple light redirecting elements for redirecting (expanding) light 38 in different directions (e.g., in an overlapping or interleaved arrangement in or on waveguide 28). In scenarios where the light redirecting elements are formed using partial mirrors oriented at different angles, the mirrors may be co-located by interleaving different mirrors at different orientations throughout coupler 32. In scenarios where the light redirecting elements are formed using diffractive gratings such as volume holograms, the diffractive gratings may be written to the same volume holographic medium (e.g., each volume hologram may be formed from different interference patterns of refractive index modulations that are superimposed on the same volume of medium). Despite being located in the same volume, the gratings in each light redirecting element may diffract incoming light in different respective directions.

Figure 3:
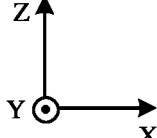
FIG. 3 is a front view of an illustrative output coupler having interleaved (co-located) light redirecting elements in accordance with some embodiments.
Figure 3:
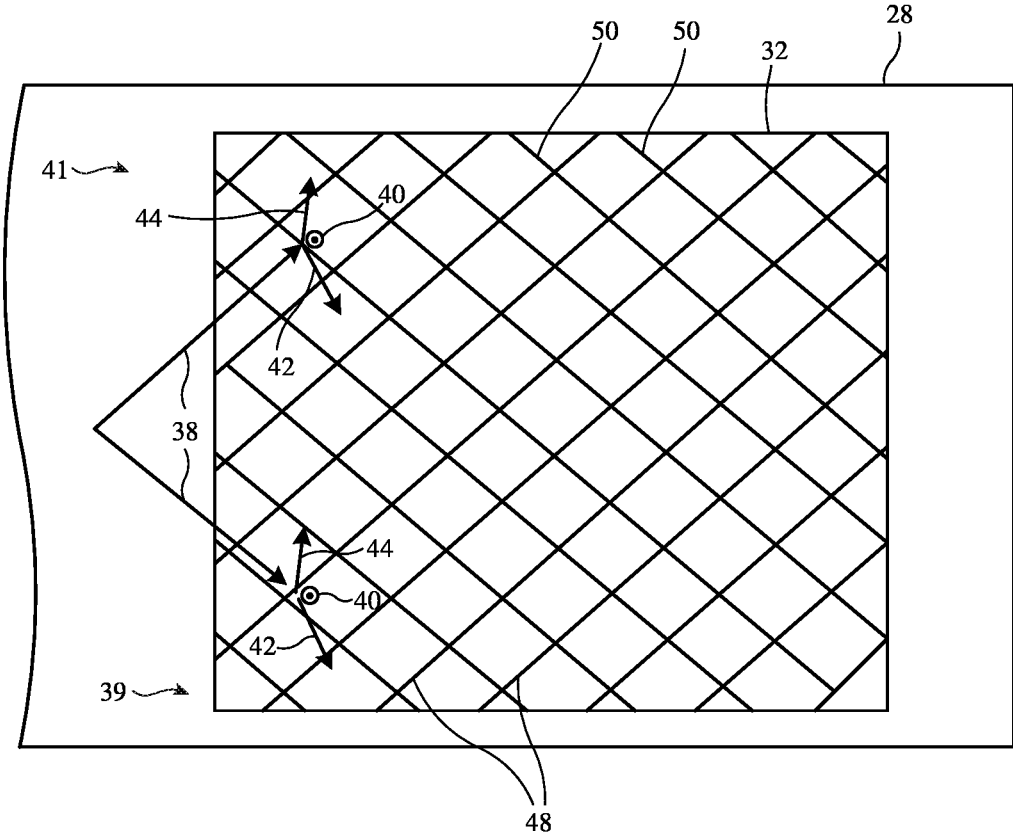

FIG. 3 is a front view of output coupler 32 having first and second light redirecting elements for redirecting image light 38 in different directions and to thereby expand the image light output from the waveguide to eye box 24 in two dimensions. As shown in FIG. 3, output coupler 32 in or on waveguide 28 may include a first light redirecting element 50 that is co-located (interleaved) with a second light redirecting element 48. In one suitable arrangement, first light redirecting element 50 may include a set of mirrors (e.g., partially reflective mirrors) arranged in a first orientation whereas second light redirecting element 50 includes a set of mirrors arranged in a second orientation. In another suitable arrangement, first light redirecting element 50 may include a first set of one or more diffraction gratings (volume holograms) arranged in a first orientation (e.g., where the alternating indices of refraction associated with element 50 are arranged parallel to a first direction) whereas second light redirecting element 48 may include a second set of one or more diffraction gratings (volume holograms) arranged in a second orientation (e.g., where the alternating indices of refraction associated with element 48 are arranged parallel to a second direction that is different from the first direction). Each set of diffraction gratings may extend across the entire volume of coupler 32, for example.

Light 38 may be conveyed to coupler 32 through waveguide 28. First light redirecting element 50 may be configured to reflect light 38 about a first reflective axis whereas second light redirecting element 48 is configured to reflect light 38 about a second reflective axis that is different from the first reflective axis. Each light redirecting element may be configured to perform dual functions on light 38. For example, each light redirecting element may be configured to redirect light 38 both in a vertical direction (parallel to the Y-axis) and may be configured to redirect light 38 out of coupler 32 (e.g., parallel to the Z-axis).

As shown in the example of FIG. 3, first light redirecting element 50 may redirect light 38 traveling in the +Y and +X directions downwards (e.g., in the −Y direction) and outwards (e.g., in the +Z direction), as shown by arrows 42 and 40. At the same time, second light redirecting element 48 may redirect light 38 traveling in the −Y and +X directions upwards (e.g., in the +Y direction) and outwards (e.g., in the +Z direction), as shown by arrows 44 and 40. In other words, light that has been +Y expanded by redirecting element 48 may be output coupled by the other light redirecting element 50 and the light that has been −Y expanded by redirecting element 50 may be output coupled by the other light redirecting element 48. In this way, each light redirecting element may perform two different redirection operations (e.g., four total redirection operations such as +Y expansion, output coupling of +Y expanded light, −Y expansion, and output coupling of −Y expanded light) so that only two redirecting elements need be formed in coupler 32 (rather than requiring four separate light redirecting components to respectively perform +Y expansion, output coupling of +Y expanded light, −Y expansion, and output coupling of −Y expanded light). This may serve to reduce the manufacturing cost and complexity of system 10, to reduce optical travel distance, to increase throughput, and to optimize space use without sacrificing field of view. In addition, this may serve to reduce the number of interactions with the light redirecting elements necessary for each of the light rays to reach the eye, thereby increasing efficiency of the output coupler.

Figure 4:
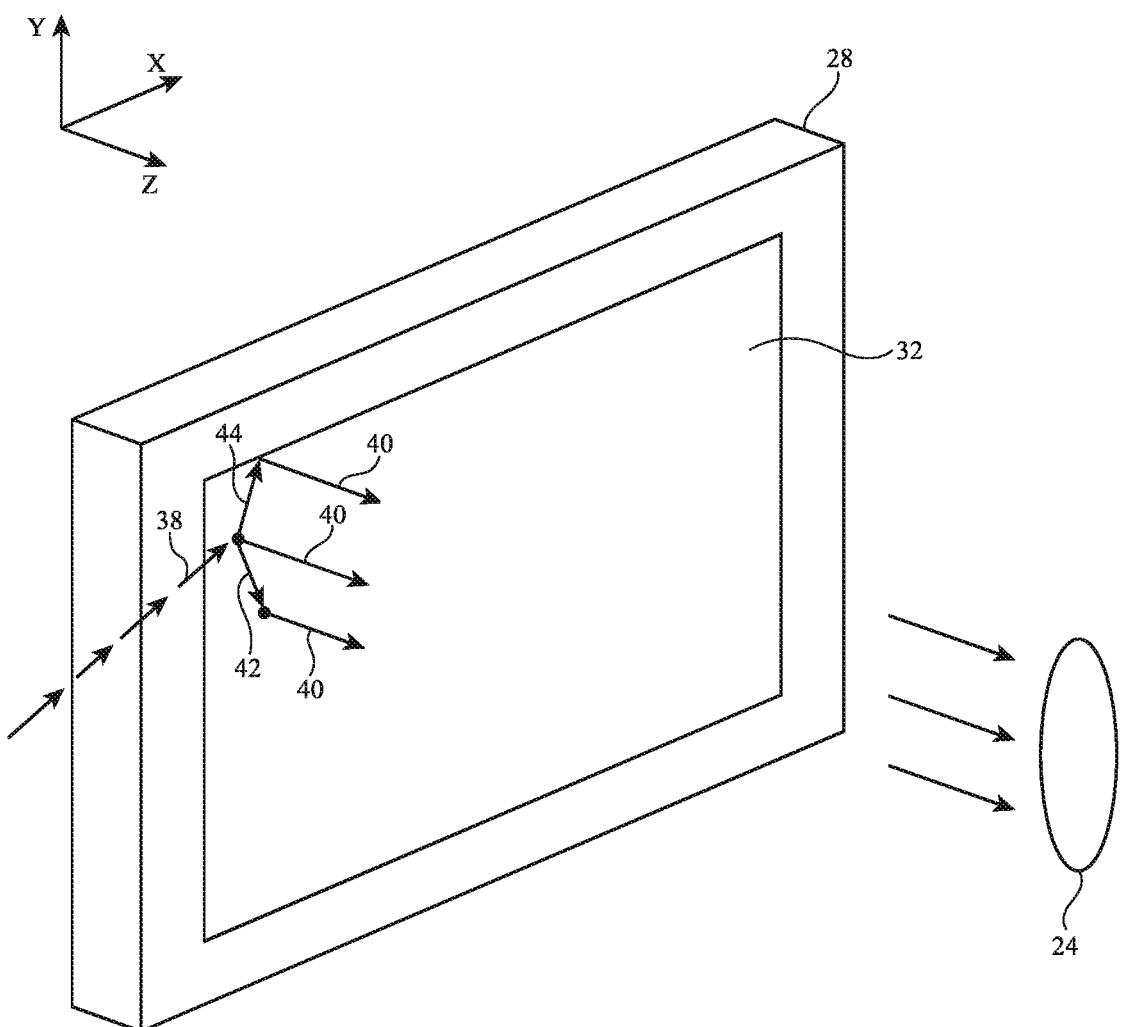
FIG. 4 is a perspective view of an illustrative output coupler having interleaved light redirecting elements in accordance with some embodiments.

FIG. 4 is a perspective view of output coupler 32. As shown in FIG. 4, light 38 provided to output coupler 32 may include inverted image 46'. Output coupler 32 may redirect light 38 in the +Y direction (as shown by arrow 44) and the +Z direction (as shown by arrow 40) using light redirecting element 48. At the same time, output coupler 32 may redirect light 38 in the −Y direction (as shown by arrow 42) and the +Z direction (as shown by arrow 40) using light redirecting element 50. By performing light expansion operations in this way using coupler 32, a relatively large eye box 24 may be filled with uniform intensity image light for a wide field of view.

Figure 5:
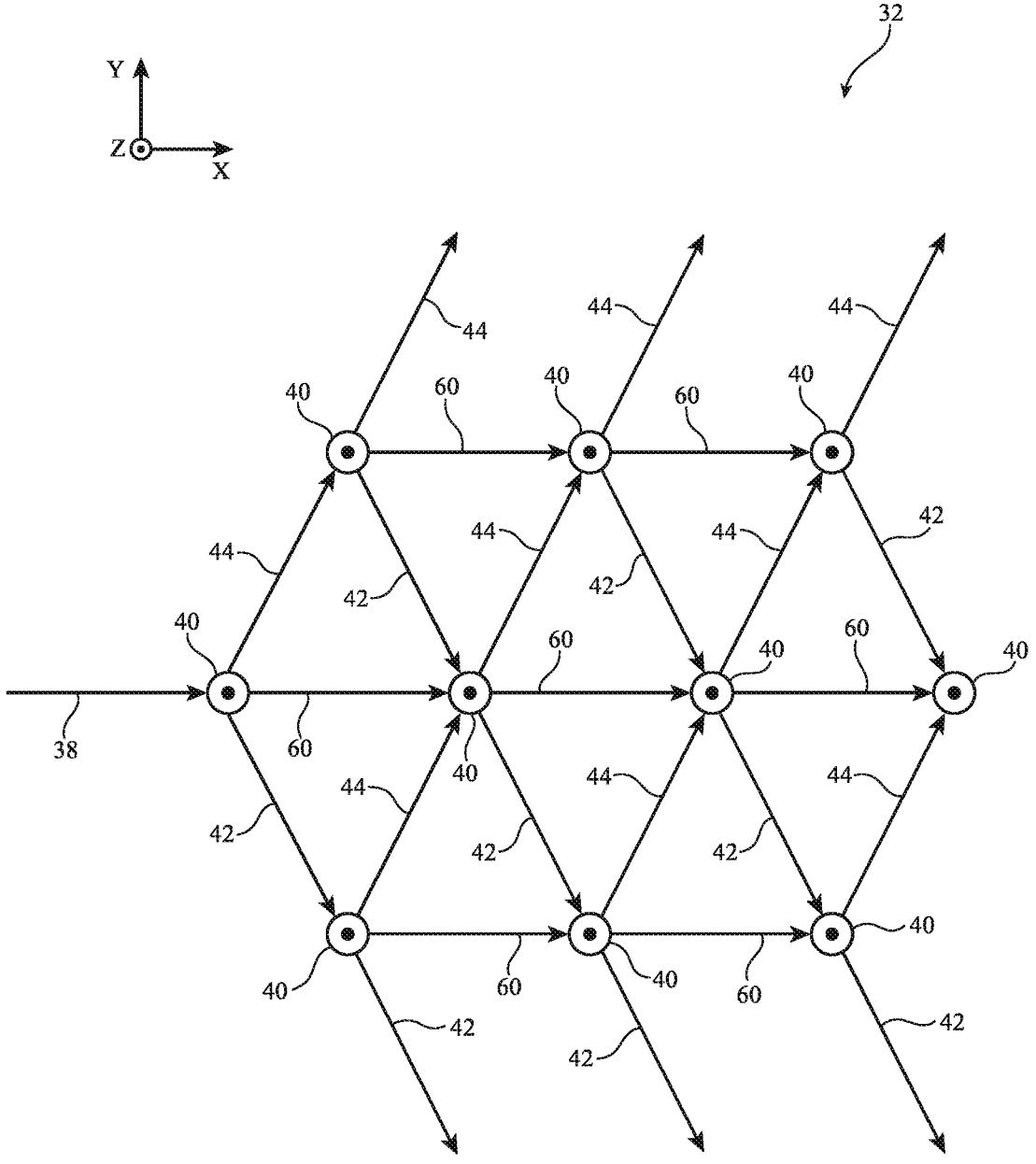
FIG. 5 is a ray diagram showing how illustrative interleaved first and second light redirecting elements in an output coupler may redirect light in different directions in accordance with some embodiments.

The examples of FIGS. 3 and 4 only show one or two light redirection operations performed by coupler 32 for the sake of clarity. In practice, these light redirections are performed throughout coupler 32 as light 38 propagates down the length of coupler 32. Light 38 may be continuously expanded in the +Y and −Y directions while propagating in the +X direction and being output coupled in the +Z direction. FIG. 5 is a ray diagram showing how light 38 may be redirected by the redirecting elements 50 and 48 in coupler 32 during propagation.

As shown in FIG. 5, incoming light 38 may be redirected in the +Y direction and in the +Z direction by redirecting elements 48 (as shown by arrows 44 and 40) and may be redirected in the −Y direction and in the +Z direction by redirecting elements 50 (as shown by arrows 42 and 40). Light redirecting elements 48 and 50 may only be partially reflective (or transmissive) and may not redirect all of the incoming light at any given point. In other words, some of light 38 continues to propagate down the length of coupler 32, as shown by arrows 60. This light is further reflected (as shown by arrows 40, 44, and 42) as it propagates down coupler 32. Arrows (rays) 44 and 40 of FIG. 5 may, for example, be produced by light redirecting element 48 of FIG. 3 whereas arrows 42 and 40 are produced by light redirecting element 50.

Figure 6:
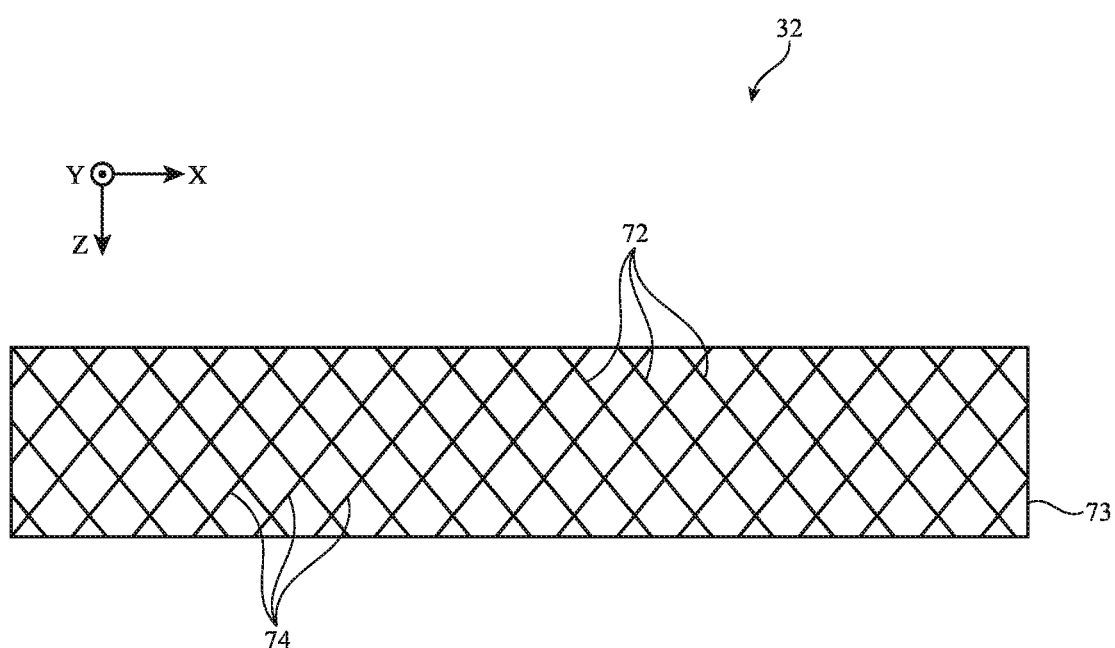
FIG. 6 is a top view showing how illustrative interleaved first and second light redirecting elements may be formed from different sets of diffractive gratings in accordance with some embodiments.

Light redirecting elements 48 and 50 may be formed using partially reflective mirrors, diffractive gratings (e.g., volume holograms, surface holograms, etc.), or other components. FIG. 6 is a top view of coupler 32 showing an example of how light redirecting elements 48 and 50 may be formed from diffractive gratings. As shown in FIG. 6, coupler 32 may include a first set of diffractive gratings 72 used to form first light redirecting element 50 and a second set of diffractive gratings 74 used to form second light redirecting element 48. The first set of gratings 72 and the second set of gratings 74 may both be written to the same volume holographic medium 73 (sometimes referred to as grating medium 73 or writing medium 73). The first set of gratings 72 may, for example, be written to medium 73 before or after writing the second set of gratings 74 to medium 73. In another suitable arrangement, the first and seconds sets of gratings may be written to different media and/or may be formed on different substrates (e.g., the sets of gratings may be overlapping either within the same volume of medium or within or on different overlapping media).

The first set of gratings 72 may be formed from variations in index of refraction that are provided with the same pitch in medium 73. The variations in index of refraction may be modulated to form one or more different diffractive gratings (holograms) within set 72. Different modulations and grating periods may be used to form the different respective gratings (holograms) within set 72, while maintaining a constant pitch. The different respective gratings may allow light redirecting element 50 to operate on a range of input angles and/or colors by redirecting light from the range of input angles and/or colors in the same output direction.

Similarly, the second set of gratings 74 may be formed from variations in index of refraction that are provided with the same pitch in medium 73. The variations in index of refraction may be modulated to form one or more different diffractive gratings (holograms) within set 74. Different modulations and grating periods may be used to form the different respective gratings (holograms) within set 74, while maintaining a constant grating pitch. The different respective gratings may allow light redirecting element 48 to operate on a range of input angles and/or colors by redirecting light from the range of input angles and/or colors in the same output direction.

In momentum space (e.g., three dimensional k-space), the first set of gratings 72 of first light redirecting element 50 may exhibit a first grating vector set from a first k-space region to a second k-space region and may exhibit a second grating vector set from a third k-space region to a fourth k-space region. The second set of gratings 74 of second light redirecting element 48 may exhibit a third grating vector set from the first region to the third region and may exhibit a fourth grating vector set from the second region to the fourth region.

The first grating vector may be associated with diffraction of incoming light in the −Y direction of FIG. 3 by the first set of gratings 72 (light redirecting element 50). The third grating vector may be associated with diffraction of incoming light in the +Y direction of FIG. 3 by the second set of gratings 74 (light redirection element 48). The second grating vector may be associated with the diffraction of the light diffracted in the +Y direction by second set of gratings 74 in the +Z direction (towards eye box 24) by the first set of gratings 72 (light redirection element 50). Similarly, the fourth grating vector may be associated with the diffraction of the light diffracted in the −Y direction by first set of gratings 72 in the +Z direction (towards eye box 24) by the second set of gratings 74.

In other words, the second set of diffraction gratings 74 may out couple the light that is diffracted in the −Y direction by the first set of gratings 72 and the first set of diffraction gratings 72 may out couple the light that is diffracted in the +Y direction by the second set of gratings 74. In this way, all of the incoming light may be out coupled towards eye box 24, regardless of whether the light was diffracted in the +Y or −Y directions (e.g., regardless of the k-space path followed so that a single coherent image 46 is produced at eye box 24 rather than double images).

The first set of gratings 72 and the second set of gratings 74 each include multiple different diffractive gratings (holograms) having grating vectors extending between different points within the first, second, third, and fourth k-space regions. In this way, each set of gratings may actually include different individual gratings for operating on input light over a range of angles. For example, the second set of gratings 74 may include an individual grating having a grating vector extending between any pair of points in the first and third k-space regions. and a grating vector extending between any pair of points in the second and fourth k-space regions. Similarly, the first set of gratings 72 may include individual gratings having grating vectors extending from any desired points in the first k-space region to corresponding points in the second k-space region and extending from any desired points in the third k-space region to corresponding points in the fourth k-space regions. The k-space regions may be three-dimensional volumes if desired so that each set of gratings operates on a range of colors in addition to a range of input angles, for example.

Figure 7A:
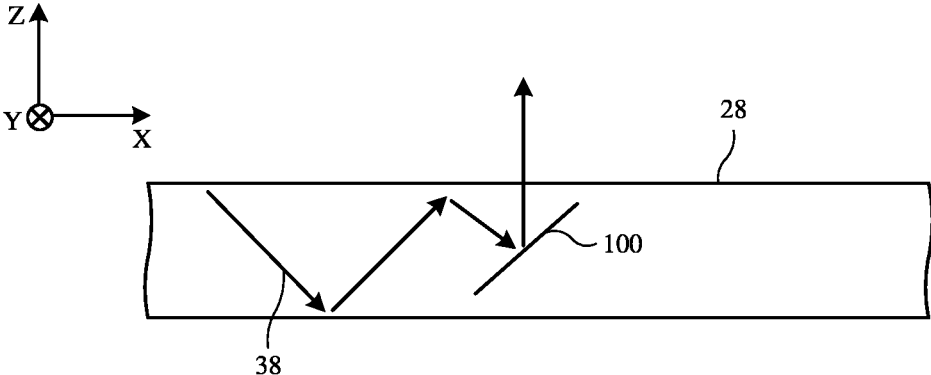
FIGS. 7A and 7B are bottom views showing how illustrative light redirecting elements may be formed using reflection-type or transmission-type diffractive gratings in accordance with some embodiments.
Figure 7B:
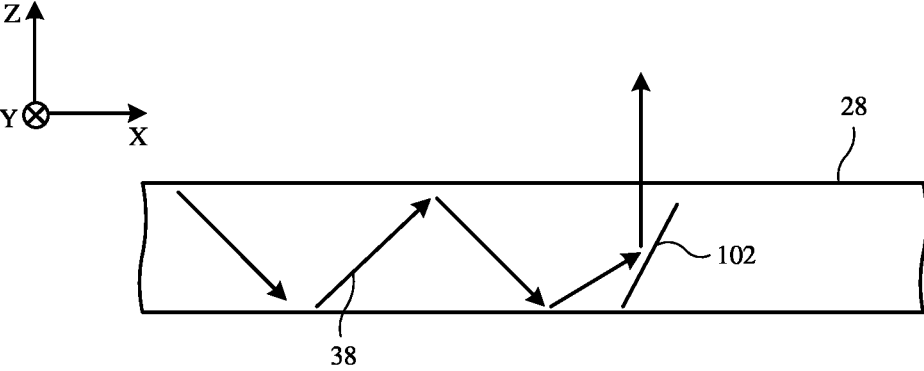

The diffractive gratings in first set 72 and second set 74 may be reflection-type (mirror-type) diffraction gratings or transmission-type diffraction gratings. FIG. 7A is a bottom view of a reflection-type grating 100 that may be used to form the gratings in sets 72 and 74. As shown in FIG. 7A, reflective grating 100 operates by diffracting light 38 with the opposite z-direction of the incident light 38 (e.g., in diffracting light 38, reflective grating 100 outputs light that propagates in a direction having a z-component opposite in sign to the z-component of the direction of incident light 38). FIG. 7B is a bottom view of a transmission grating-type diffraction grating 102 that may be used to form the gratings in sets 72 and 74. As shown in FIG. 7B, transmission grating 102 operates by diffracting light 38 with the same z-direction of the incident light 38 (e.g., in diffracting light 38, transmission grating 102 outputs light that propagates in a direction having a z-component with the same sign as the z-component of the direction of incident light 38). Either of the reflection-type gratings 100 of FIG. 7A or the transmission-type gratings 102 of FIG. 7B may be used to implement the diffractive gratings in light redirecting elements 48 and 50.

Figure 8:
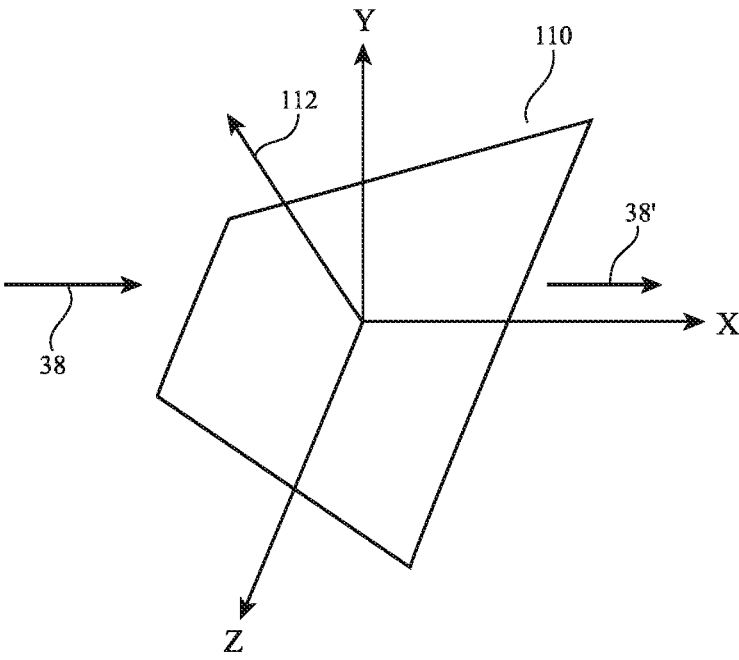
FIG. 8 is a perspective view of an illustrative light redirecting element formed from a partially-reflective mirror in accordance with some embodiments.

In another suitable arrangement, light redirecting elements 48 and 50 may be formed using partial mirrors. FIG. 8 is a perspective view of an illustrative partial mirror 110 that may be used to form light redirecting elements 48 and 50. As shown in FIG. 8, partial mirror 110 may reflect a first portion of incoming light 38 and may transmit a second portion 38' of the incoming light. Mirror 110 may have a normal axis 112 that is oriented at non-zero angles with respect to each of the X, Y, and Z axes. This may allow mirror 110 to reflect light 38 in both the +Y and +Z directions (e.g., when used to implement light redirecting element 48 of FIG. 3) or to reflect light 38 in both the −Y and +Z directions (e.g., when used to implement light redirecting element 50 of FIG. 3). Mirrors such as mirrors 110 that are oriented in different directions (e.g., for elements 48 and 50) may be distributed in an interleaved pattern throughout output coupler 32. These examples are merely illustrative and, in general, any desired diffractive and/or reflective structures may be used to form light redirection elements 48 and 50.

When configured using the structures of FIGS. 1-8, display 20 may exhibit a relatively wide field of view and may fill a relatively wide eye box 24 with light of uniform intensity. Co-locating light redirection elements 48 and 50 may reduce the optical travel distance for light 38 to reduce haze and scattering in the system while occupying a reduced or minimal amount of space within system 10.

In some arrangements, input coupler 30 may include a volume holograms or surface relief gratings. In these arrangements, input coupler 30 may introduce undesirable dispersion to light 38 in which the light diffracted by input coupler 30 propagates at different angles as a function of wavelength within the waveguide. In order to mitigate these issues, the first set of gratings 72 and the second set of gratings 74 in output coupler 32 (e.g., light redirecting elements 48 and 50) may be configured to mitigate dispersion produced by input coupler 30.

Figure 9:
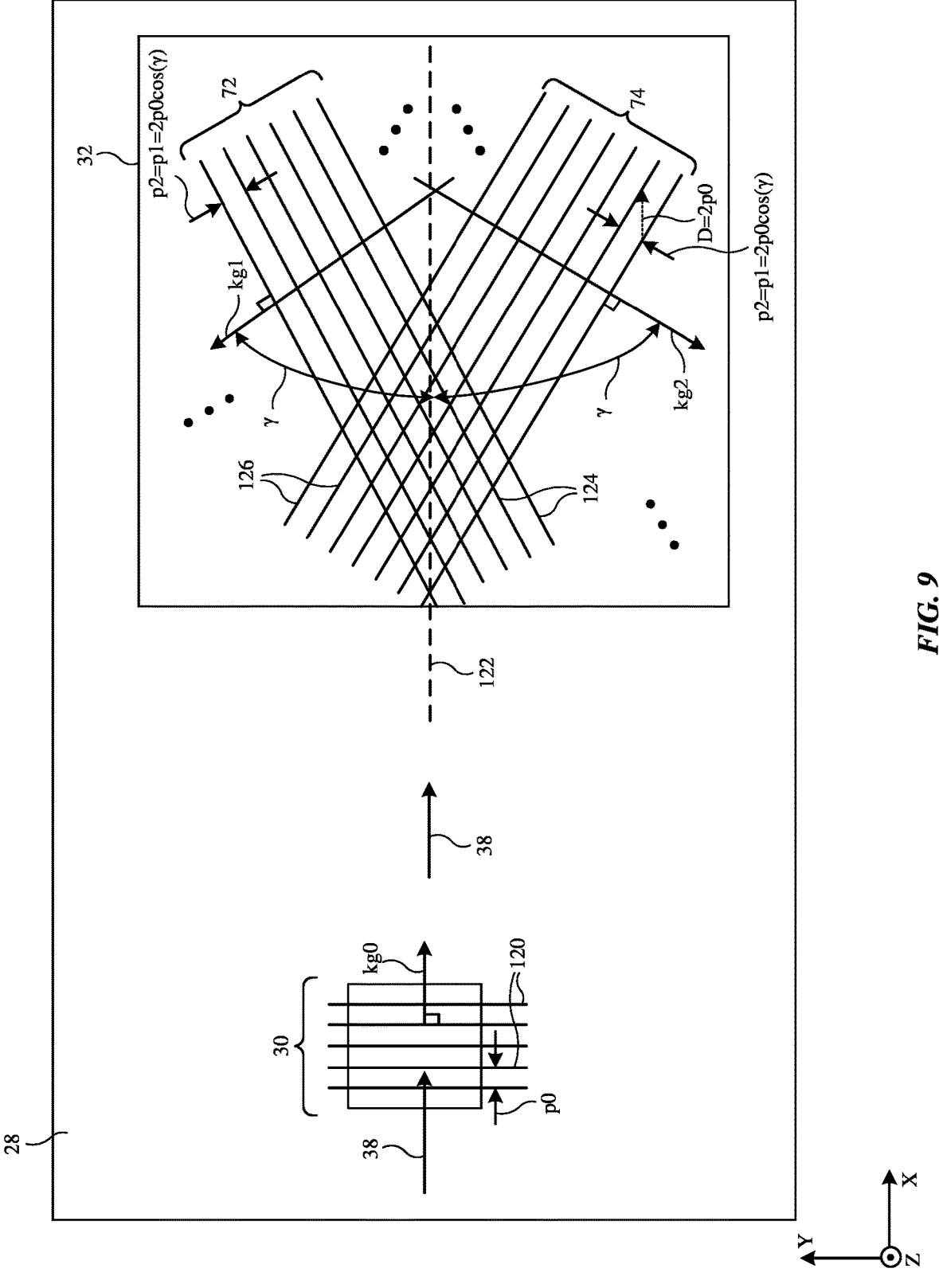
FIG. 9 is a front view of showing how an illustrative output coupler may mitigate dispersion by a diffractive input coupler in accordance with some embodiments.

FIG. 9 is a front view showing how the first set of gratings 72 and the second set of gratings 74 in output coupler 32 may be configured to mitigate dispersion produced by input coupler 30. As shown in FIG. 9, input coupler 30 may include diffractive grating structures (e.g., volume holograms or surface relief gratings) with fringes 120. The grating medium for the diffractive grating structures may have a periodic modulation of refractive index that occurs in periodic fringes such as fringes 120 (e.g., planes of constant refractive index of the grating medium). The portions of the grating medium that form fringes 120 may have one refractive index, whereas the portions of the grating medium between fringes 120 may have other refractive indices.

In the example of FIG. 9, fringes 120 in input coupler 30 are parallel to and equidistant from one another. Fringes 120 may have a constant pitch p0 across input coupler 30. Pitch p0 measures the distance between adjacent fringes 120 as measured along the surface of the grating medium (e.g., the surface of the grating medium that extends parallel to the X-Y plane of FIG. 9 and that contacts the lateral/planar surface of a waveguide substrate for waveguide 28). The diffractive grating structures in input coupler 30 may also be characterized by a corresponding grating vector. The grating vector of the diffractive grating structures in input coupler 30 has a two-dimensional projection kg0 onto the lateral/planar surface of waveguide 28 (e.g., in the X-Y plane of FIG. 9). The two-dimensional projection kg0 of the grating vector (sometimes referred to herein as two-dimensional grating vector projection kg0 or simply as grating vector projection kg0) has an orientation that is normal to the plane of fringes 120 (e.g., grating vector kg0 may be oriented in the direction of central axis 122, parallel to the X-axis of FIG. 9). Input coupler 30 (e.g., the diffractive grating structure having fringes 120) may couple light 38 into waveguide 28 at angles such that the light propagates down the length of waveguide

28 via total internal reflection (e.g., light 38 may be coupled into waveguide 28 at angles within the total internal reflection range of waveguide 28).

Image light 38 may be incident upon output coupler 38 while propagating in the direction of central axis 122 (e.g., a longitudinal axis running through the center of waveguide 28 parallel to the X-axis). As shown in FIG. 9, the first set of gratings 72 in output coupler 32 may include diffractive grating structures (e.g., volume holograms) having fringes 124. Fringes 124 may have a constant pitch p1 across output coupler 32. Pitch p1 measures the distance between adjacent fringes 124 as measured along the surface of the grating medium (e.g., the surface of the grating medium that extends parallel to the X-Y plane of FIG. 9 and that contacts a waveguide substrate for waveguide 28). The diffractive grating structures in the first set of gratings 72 may also be characterized by a period A that measures the distance in a normal direction between adjacent fringes 124. While illustrated as lines in FIG. 9 for the sake of clarity, the plane of fringes 124 may also be tilted at a non-zero angle with respect to both the normal and lateral surfaces of waveguide 28 (e.g., thereby allowing fringes 124 to diffract light 38 out of the waveguide and towards the eye box).

The diffractive grating structures in the first set of gratings 72 may also be characterized by a corresponding grating vector. The grating vector of the diffractive grating structures in the first set of gratings 72 has a two-dimensional projection kg1 onto the lateral/planar surface of waveguide 28 (e.g., in the X-Y plane of FIG. 9). The two-dimensional projection kg1 of the grating vector (sometimes referred to herein as two-dimensional grating vector projection kg1 or simply as grating vector projection kg1) has an orientation that is normal to the plane of fringes 124. For example, grating vector projection kg1 may be oriented at an angle γ with respect to central axis 122. Angle γ may be less than, equal to, or greater than 45 degrees, as examples. The diffractive grating structures in the first set of gratings 72 may, for example, diffract incident light 38 upwards (e.g., in the +Y direction) for subsequent diffraction by the second set of gratings 74 and may diffract light that has already been diffracted by the second set of gratings 74 (e.g., in the −Y direction) out of waveguide 28 and towards the eye box (e.g., in the +Z direction).

The second set of gratings 74 in output coupler 32 may include diffractive grating structures (e.g., volume holograms) having fringes 126. Fringes 126 may have a constant pitch p2 across output coupler 32. Pitch p2 measures the distance between adjacent fringes 126 as measured along the surface of the grating medium (e.g., the surface of the grating medium that extends parallel to the X-Y plane of FIG. 9 and that contacts a waveguide substrate for waveguide 28). The diffractive grating structures in the second set of gratings 74 may also be characterized by a period A that measures the distance in a normal direction between adjacent fringes 126. While illustrated as lines in FIG. 9 for the sake of clarity, the plane of fringes 126 may also be tilted at a non-zero angle with respect to both the normal and lateral surfaces of waveguide 28 (e.g., thereby allowing fringes 126 to diffract light 38 out of the waveguide and towards the eye box).

The diffractive grating structures in the second set of gratings 74 may also be characterized by a corresponding grating vector. The grating vector of the diffractive grating structures in the second set of gratings 74 has a two-dimensional projection kg2 onto the lateral/planar surface of waveguide 28 (e.g., in the X-Y plane of FIG. 9). Two-dimensional projection kg2 of the grating vector (sometimes referred to herein as two-dimensional grating vector projection kg2 or simply as grating vector projection kg2) has an orientation that is normal to the plane of fringes 126. For example, grating vector projection kg2 may be oriented at angle $-\gamma$ with respect to central axis 122 (e.g., fringes 124 and fringes 126 may each extend at angle $\gamma$ but from opposing sides of central axis 122). Grating vector projection kg1 may be oriented at a non-perpendicular angle with respect to grating vector projection kg2 (e.g., the angular separation of grating vector projections kg1 and kg2 may be less than or greater than 90 degrees) or, if desired, grating vector projection kg1 may be oriented perpendicular to grating vector projection kg2 (e.g., the angular separation of grating vector projections kg1 and kg2 may be equal to 90 degrees). In other words, central axis 122 bisects the angle $2\gamma$ between grating vector projections kg1 and kg2. The diffractive grating structures in the second set of gratings 74 may, for example, diffract incident light 38 downwards (e.g., in the $-Y$ direction) for subsequent diffraction by the first set of gratings 72 and may diffract light that has already been diffracted by the first set of gratings 72 (e.g., in the $+Y$ direction) out of waveguide 28 and towards the eye box (e.g., in the $+Z$ direction). When configured in this way, light that enters the waveguide at a positive angle with respect to central axis 122 will also exit at a positive angle with respect to central axis 122. This is because the first diffraction of the light in output coupler 32 first inverts images in the light but the second diffraction of the light in output coupler 32 reverses the inversion upon diffracting the light out of the waveguide, thereby eliminating the need to invert the parity of the images in light 38 prior to light 38 being provided to waveguide 28.

The diffraction of light 38 by fringes 120 of input coupler 30 may introduce undesirable dispersion into light 38. The first and second sets of gratings 72 and 74 in output coupler 32 may be configured to cancel out the dispersion introduced to light 38 by input coupler 30. In order to cancel out this dispersion, grating vector projections kg1 and kg2 may each be oriented at the same angle $\gamma$ but from opposing sides of central axis 122 (e.g., fringes 126 and 124 may be symmetrical about the X-axis), pitch p1 may be equal to pitch p2 (e.g., fringes 124 and 126 may each have the same constant pitch), and pitches p1 and p2 may each be equal to twice pitch p0 multiplied by the cosine of angle $\gamma$ (e.g., pitches p1 and p2 may be determined using equation 1).

$$p1=p2=2*p0*\cos(\gamma) \tag{1}$$

In equation 1, "*" is the multiplication operator. When oriented in this way, fringes 124 may be separated and fringes 126 may be separated in a direction parallel to central axis 122 and the X-axis of FIG. 9 by distance D, where distance D is equal to two times the pitch p0 of input coupler 30. Recording the first set of gratings 72 and the second set of gratings 74 in this way may configure the gratings to cancel out dispersion introduced by the gratings in input coupler 30, while also configuring the gratings to couple the light out of waveguide 28.

In the example of FIG. 9, only one grating is illustrated in input coupler 30. Similarly, only one grating in the first set of gratings 72 and one grating in the second set of gratings 74 are illustrated as being multiplexed in output coupler 32. This is merely for the sake of clarity. In general, there may be additional multiplexed gratings in each set and in the input coupler for diffracting incident light 38 over a range of incident angles, output angles, and wavelengths. There may, for example, be two gratings in output coupler 32 (e.g., one grating from the first set 72 and one grating from the second set 74) for every grating in input coupler 30. Forming output coupler 32 using volume holograms (e.g., volume holograms in the first set of gratings 72 and the second set of gratings 74) may minimize the cosmetic impact of output coupler 32 to external observers of system 10.

In accordance with an embodiment, a display system is provided that includes a waveguide having a lateral surface; an input coupler having a diffractive grating configured to couple image light into the waveguide, the diffractive grating having a first grating vector with a first grating vector projection onto the lateral surface of the waveguide; and an output coupler configured to couple the image light out of the waveguide, the output coupler includes a first volume hologram having a constant pitch and a second grating vector, the second grating vector has a second grating vector projection onto the lateral surface of the waveguide and the second grating vector projection is oriented at an angle $\gamma$ with respect to the first grating vector projection, and a second volume hologram that at least partially overlaps the first volume hologram and that has a constant pitch and a third grating vector, the third grating vector has a third grating vector projection onto the lateral surface of the waveguide and the third grating vector projection is oriented at an angle $-\gamma$ with respect to the first grating vector.

In accordance with another embodiment, the diffractive grating includes a surface relief grating.

In accordance with another embodiment, the diffractive grating includes a third volume hologram.

In accordance with another embodiment, the diffractive grating has a first pitch and the first volume hologram has a second pitch that is different from the first pitch.

In accordance with another embodiment, the second volume hologram has the second pitch.

In accordance with another embodiment, the second pitch is directly proportional to a cosine of the angle $\gamma$.

In accordance with another embodiment, the second pitch is equal to twice the first pitch times the cosine of the angle $\gamma$.

In accordance with another embodiment, the first volume hologram is configured to diffract the image light to produce diffracted light and the second volume hologram is configured to diffract the diffracted light out of the waveguide.

In accordance with an embodiment, an optical system is provided that includes a waveguide having a planar surface; an input coupler configured to couple image light into the waveguide, the input coupler includes a diffractive grating having a first pitch; and an output coupler configured to couple the image light out of the waveguide, the output coupler includes a first volume hologram having a second pitch and a first grating vector, the first grating vector having a first grating vector projection onto the planar surface of the waveguide, and a second volume hologram at least partially overlapping the first volume hologram and having the second pitch and a second grating vector, the second grating vector has a second grating vector projection onto the planar surface of the waveguide, the first grating vector projection is oriented at an angle from a first side of an axis, the second grating vector projection is oriented at the angle from a second side of the axis, and the second pitch is equal to twice the first pitch times a cosine of the angle.

In accordance with another embodiment, the diffractive grating has a third grating vector with a third grating vector projection onto the planar surface of the waveguide, the third grating vector projection being oriented parallel to the axis.

In accordance with another embodiment, the input coupler includes a third volume hologram.

In accordance with another embodiment, the input coupler includes a surface relief grating.

In accordance with another embodiment, the first and second volume holograms have a constant pitch across the output coupler.

In accordance with another embodiment, the first and second volume holograms have fringes with planes that are non-parallel and non-perpendicular with respect to a normal axis of the planar surface of the waveguide, the output coupler being configured to couple the image light out of the waveguide through the planar surface.

In accordance with another embodiment, the first volume hologram is configured to diffract the image light as first diffracted light, the second volume hologram is configured to diffract the image light as second diffracted light, the second volume hologram is configured to diffract the first diffracted light out of the waveguide, and the first volume hologram is configured to diffract the second diffracted light out of the waveguide.

In accordance with an embodiment, a display system is provided that includes a waveguide; a diffractive input coupler configured to couple image light into the waveguide; and an output coupler includes a first hologram configured to diffract the image light as first diffracted light, and a second hologram at least partially overlapping the first hologram and configured to diffract the image light as second diffracted light, the first hologram is configured to diffract the second diffracted light out of the waveguide, the second hologram is configured to diffract the first diffracted light out of the waveguide, and the first and second holograms are configured to cancel out a dispersion in the image light produced by the diffractive input coupler.

In accordance with another embodiment, the waveguide has a waveguide surface, the first hologram has a first grating vector, the first grating vector has a first grating vector projection onto the waveguide surface, the first grating vector projection is oriented at an angle $\gamma$ with respect to an axis, the second hologram has a second grating vector, the second grating vector has a second grating vector projection onto the waveguide surface, and the second grating vector projection is oriented at an angle $-\gamma$ with respect to the axis.

In accordance with another embodiment, the first hologram has a first pitch and the second hologram has the first pitch.

In accordance with another embodiment, the diffractive input coupler has a second pitch, the first pitch being equal to twice the second pitch times a cosine of the angle $\gamma$.

In accordance with another embodiment, the first pitch is constant across a lateral area of the output coupler.

The foregoing is merely illustrative and various modifications can be made to the described embodiments. The foregoing embodiments may be implemented individually or in any combination.

What is claimed is:

1. A display system comprising:
a waveguide having a lateral surface;
an input coupler having a first diffractive grating configured to couple image light into the waveguide, the first diffractive grating having a first grating vector with a first grating vector projection onto the lateral surface of the waveguide and having a first pitch; and
an output coupler configured to couple the image light out of the waveguide, the output coupler comprising:
a second diffractive grating having a second pitch and a second grating vector, wherein the second grating vector has a second grating vector projection onto the lateral surface of the waveguide and the second grating vector projection is oriented at an angle with respect to the first grating vector projection, and
a third diffractive grating that at least partially overlaps the second diffractive grating and that has the second pitch and a third grating vector, wherein the third grating vector has a third grating vector projection onto the lateral surface of the waveguide and the third grating vector projection is oriented at a negative of the angle with respect to the first grating vector, wherein
the second pitch is constant,
the second pitch is equal to twice the first pitch times a cosine of the angle, and
the second and third diffractive gratings each diffract the image light.

2. The display system of claim 1, wherein the first, second, and third diffractive gratings comprise surface relief gratings.

3. The display system of claim 1, wherein the first, second, and third diffractive gratings comprise volume holograms.

4. The display system of claim 1, wherein the second diffractive grating is configured to diffract the image light to produce diffracted light and wherein the third diffractive grating is configured to diffract the diffracted light out of the waveguide.

5. The display system of claim 1, wherein the image light coupled into the waveguide propagates towards the output coupler along an axis, the second grating vector projection is oriented at the angle from a first side of the axis, and the third grating vector projection is oriented at the angle from a second side of the axis opposite the first side of the axis.

6. The display system of claim 5, wherein the second and third diffractive gratings have fringes with planes that are non-parallel and non-perpendicular with respect to a normal axis of the lateral surface of the waveguide, the output coupler being configured to couple the image light out of the waveguide through the lateral surface.

7. The display system of claim 5, wherein the second diffractive grating is configured to diffract the image light as first diffracted light, the third diffractive grating is configured to diffract the image light as second diffracted light, the third diffractive grating is configured to diffract the first diffracted light out of the waveguide, and the second diffractive grating is configured to diffract the second diffracted light out of the waveguide.

8. The display system of claim 7, wherein the first diffractive grating comprises a surface relief grating, the second diffractive grating comprises a first volume hologram, and the third diffractive grating comprises a second volume hologram.

9. The display system of claim 1, wherein the second and third diffractive gratings are configured to cancel out a dispersion in the image light produced by the first diffractive grating.

10. The display system of claim 1, wherein the waveguide comprises a grating medium having a thickness orthogonal to the lateral surface, the second and third diffractive gratings are formed in the grating medium, and the second and third diffractive gratings extend across an entirety of the thickness of the grating medium.

11. A head mounted display device comprising:
a waveguide having a planar surface;
an input coupler that includes a first diffractive grating configured to couple light into the waveguide, the first diffractive grating having a first pitch and being characterized by a first grating vector with a first grating vector projection onto the planar surface of the waveguide; and an output coupler configured to couple the light out of the waveguide, the output coupler comprising:

a second diffractive grating having a second pitch and characterized by a second grating vector, wherein the second grating vector has a second grating vector projection onto the planar surface of the waveguide and the second grating vector projection is oriented at an angle with respect to the first grating vector projection, and a third diffractive grating that at least partially overlaps the second diffractive grating, that has the second pitch, and that is characterized by a third grating vector, wherein the third grating vector has a third grating vector projection onto the planar surface of the waveguide and the third grating vector projection is oriented at a negative of the angle with respect to the first grating vector, wherein the second pitch is constant, the second pitch is equal to twice the first pitch times a cosine of the angle, and the second and third diffractive gratings each diffract the image light.

12. A display comprising:

a waveguide configured to propagate light via total internal reflection;

a first diffractive grating configured to couple the light into the waveguide, wherein the first diffractive grating has a first pitch and is characterized by a first grating vector that has a first projection onto a lateral surface of the waveguide;

a second diffractive grating configured to couple at least some of the light out of the waveguide, wherein the second diffractive grating has a second pitch, the second diffractive grating is characterized by a second grating vector that has a second projection onto the lateral surface of the waveguide, and the second projection is oriented at an angle with respect to the first projection; and a third diffractive grating configured to couple at least some of the light out of the waveguide, wherein the third diffractive grating has the second pitch, the third diffractive grating is characterized by a third grating vector that has a third projection onto the lateral surface of the waveguide, and the third projection is oriented at a negative of the angle with respect to the first projection, wherein the second pitch is constant, the second pitch is equal to twice the first pitch times a cosine of the angle, and the second and third diffractive gratings each diffract the image light.

\* \* \* \* \*